United States Patent [19]

Dorschner et al.

[11] Patent Number: 5,004,343

[45] Date of Patent: * Apr. 2, 1991

[54] MULTIPLE RING PATHS IN ONE BLOCK

[75] Inventors: Terry A. Dorschner, Newton Centre; Irl W. Smith, Newton, both of Mass.

[73] Assignee: Raytheon Company, Lexington, Mass.

[*] Notice: The portion of the term of this patent subsequent to Mar. 21, 2006 has been disclaimed.

[21] Appl. No.: 263,965

[22] Filed: Oct. 27, 1988

Related U.S. Application Data

[63] Continuation of Ser. No. 912,133, Mar. 14, 1986, abandoned, which is a continuation of Ser. No. 412,402, Aug. 27, 1982, abandoned.

[51] Int. Cl.$^5$ .................... G01C 19/64; H01S 3/101
[52] U.S. Cl. ..................... 356/350; 372/94

[56] References Cited

U.S. PATENT DOCUMENTS

| | | | |
|---|---|---|---|
| 3,484,721 | 4/1967 | Bond et al. | 331/94.5 |
| 3,503,688 | 3/1970 | Lechevalier | 356/106 |
| 3,741,657 | 6/1973 | Andringa | 356/106 LR |
| 3,841,758 | 10/1974 | Gievers | 356/350 |
| 3,854,819 | 12/1974 | Andringa | 356/106 LR |
| 4,108,553 | 8/1978 | Zampiello et al. | 356/106 LR |
| 4,110,045 | 8/1978 | Smith, Jr. et al. | 356/106 LR |
| 4,141,651 | 2/1979 | Smith et al. | 356/350 |
| 4,152,071 | 5/1979 | Rodganski | 356/350 |
| 4,229,106 | 10/1980 | Dorschner et al. | 356/350 |
| 4,247,832 | 1/1981 | Sanders et al. | 372/94 |
| 4,379,027 | 8/1983 | Zampiello et al. | 356/350 |
| 4,407,583 | 10/1983 | Simms | 356/350 |
| 4,420,836 | 12/1983 | Harper | 372/94 |
| 4,470,701 | 9/1984 | Smith | 372/106 |
| 4,477,188 | 10/1984 | Stiles et al. | 372/94 |
| 4,616,929 | 10/1986 | Bernelin et al. | 356/350 |

FOREIGN PATENT DOCUMENTS 8006298 3/1983 France ................. 356/350

OTHER PUBLICATIONS

U.S. Patent Application 257,303 Smith et al., Laser Gyro Biasing System.
U.S. Patent Application 412,401 M. Holz, Ring Laser Gyro.
U.S. Patent Application 412,442 M. Holz, Ring Laser Gyro.
U.S. Patent Application 412,459 T. Dorschner, Orthohedral Ring Laser Gyro.
U.S. Patent Application 412,460 Dorschner et al., Skewed Rhombus Ring Laser Gyro.
U.S. Patent Application 412,456 Dorschner et al., Diagonal Pathlength Control.
U.S. Patent Application 412,457 Dorschner et al., Diagonal Pathlength Control.
DTIC Technical Abstract Bulletin No. 80-13, Jun. 1980.
NTIS Government Reports Announcements and Index, No. 9, Apr. 27, 1979, p. 175.
"Multioscillator Ring Laser Gyro, Final Report", Jul. 1978.
"Azimuth Determination Using a Low Noise Ring Laser Gyro Inertial Measurement Unit", J. B. Matthews, M. I. Gneses, D. J. Pasik.
"Properties of a Zeeman Multioscillator Ring Laser Gyro", Sanders et al., IEEE CH1449-8/79, 1979, pp. 2-6.
"Ring Laser Gyro Technology for Advanced Aircraft Navigation (Phase II)", J. B. Matthews et al., Technical Report AFWAL-TR-80-1174, Raytheon Co. 11/80, pp. 141-149.
DTIC Technical Abstract Bulletin No. 81-18, 8/28/81, No. AD-B952 519, p. 35.
"Ring Laser Gyro Technology for Advanced Aircraft Navigation (Phase I)", Technical Report AFAL--TR-79-1193, Raytheon Company, Dec. 1979, J. B. Matthews et al.

Primary Examiner—Nelson Moskowitz
Attorney, Agent, or Firm—Christopher L. Maginniss; Richard M. Sharkansky

[57] ABSTRACT

A laser gyro system wherein a plurality of nonplanar ring laser gyros are nested within a common supporting block of material. The nonplanar ring laser gyros have a ring path whose circumscribing volume has a size of the order of the volume of the supporting block, each ring path utilizing a portion of the volume unused by the other. In one embodiment, a cubic block contains two orthogonal tetrahedral ring laser gyros. The two rings intersect and share a common gas envelope. In another embodiment, the supporting block contains two orthohedral ring laser paths.

26 Claims, 4 Drawing Sheets

MULTIPLE RING PATHS IN ONE BLOCK

This application is a continuation of application Ser. No. 912,133, filed Mar. 14, 1986, which is a continuation of application Ser. No. 412,402 filed Aug. 27, 1982, now abandoned.

BACKGROUND OF THE INVENTION

Integration of a plurality of single-axis ring laser gyros for producing a given rotation-sensing array such as, for instance, one requiring sensing along three orthogonal axes, results in an undesirably large volume requirement. One application has used a single sphere to enclose three separate triangular ring laser gyro paths nested in one common circumscribing volume. The three nested paths are planar. Such planar two-frequency gyros require mechanical dither to avoid a dead band at low rotation rates due to lock-in. The simultaneous dither results in adverse coupling between the individual nested gyros.

SUMMARY OF THE INVENTION

A preferred type of gyro is the multi-oscillator gyro using a nonplanar path of the type described in U.S. Pat. No. 4,110,045, issued Aug. 29, 1978 to Smith, Jr. et al. and assigned to the present assignee. The multi-oscillator gyro requires no dither, consequently, multiple single-axis units nested in a single supporting block remain independent.

This invention provides for a ring laser gyro having a convenient form factor which contains a plurality of laser gyros sharing a supporting block. A plurality of these blocks may be easily stacked to provide for a predetermined oriented sensor array which is adapted to sense rotation along three independent axes and can include redundant sensing along one or more of these axes. Within each block, the laser gyros have a ring path size and form factor such that the circumscribing volume is of the order of the size of the supporting block. Each ring path utilizes block regions unused by the other paths, thus efficiently nesting the laser gyros in a single block. Preferably, each ring laser gyro uses a ring path having four equal length path segments disposed on two planes. This nonplanar path and a Faraday rotator placed therein provide, respectively, to a propagating beam of electromagnetic energy, the reciprocal and nonreciprocal polarization rotations necessary for a four-frequency laser gyro.

In one embodiment, two sets of four mirrors are placed at the corners of a supporting cube to provide two nested equiangular and equilateral skew rhombus rings. Such paths are referred to as tetrahedral paths. In another embodiment, two sets of four mirrors are placed at the corners and on the faces of a supporting cube to provide two nested equilateral skew rhombic paths having path portions on two orthogonal planes parallel the faces of the cube. Such paths are referred to as orthohedral paths.

BRIEF DESCRIPTION OF THE DRAWINGS

The present invention may be better understood with reference to the accompanying drawings wherein.

DESCRIPTION OF THE PREFERRED EMBODIMENT

Figure 1:
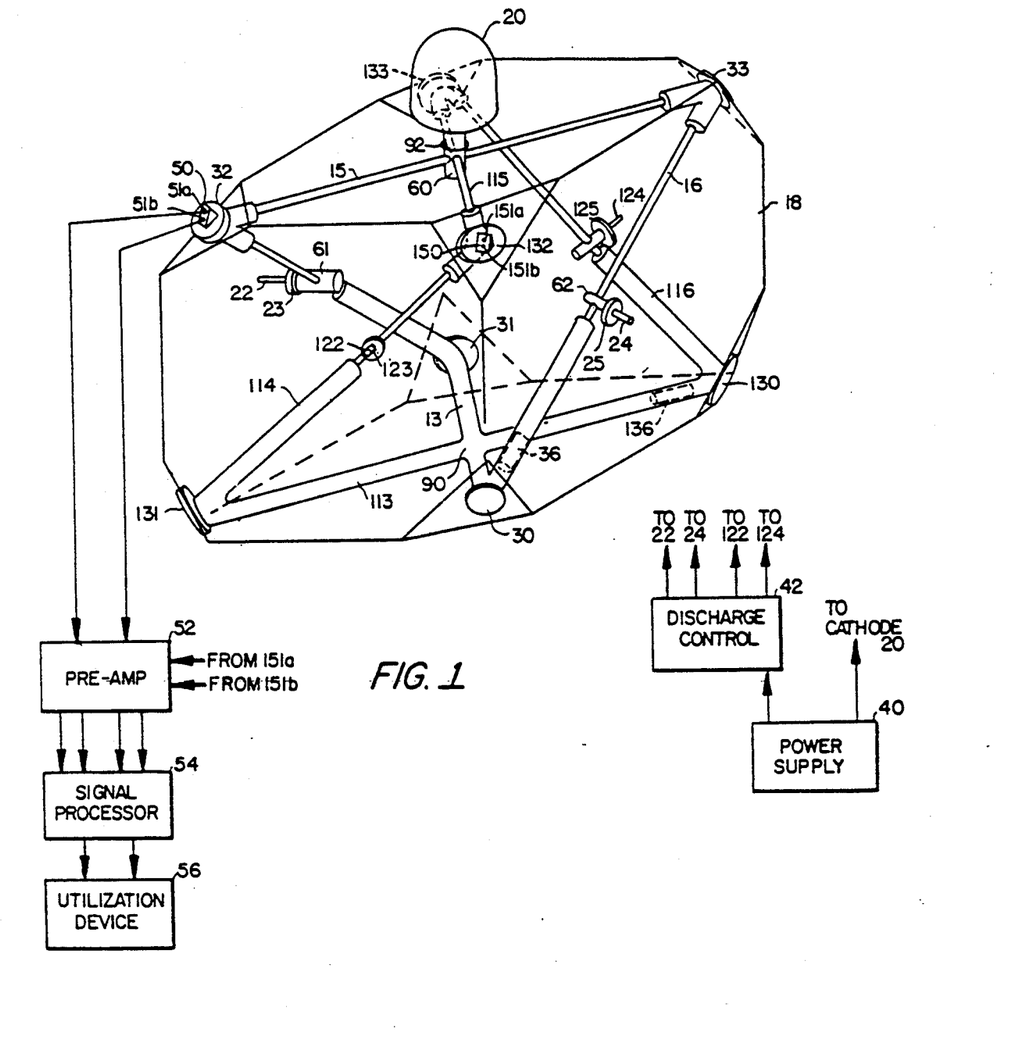
FIG. 1 shows a first embodiment of the nested ring laser gyro system of the present invention using a tetrahedral ring path.

Referring now to FIG. 1, there is shown the laser gyro system 10 of the present invention. The ring laser gyro has two nonplanar paths nested within cubic block 18. They are shown as paths 12 and 112, respectively, by the solid and dashed lines in FIG. 3. Path 12 is formed by passages 13, 14, 15 and 16 and mirrors 30, 31, 32 and 33. Passages 13, 14, 15 and 16 are drilled in supporting gyro block 18. Mirrors 30, 31, 32 and 33 are located at the corresponding intersections of passages 13 through 16 and are mounted on the planes resulting from cutting off corners of block 18. The intersection of the centerlines of any two adjacent passages lies in a corresponding one of these planes. The aforesaid intersection points form the vertices of a regular tetrahedron, resulting in a ring path which is equiangular as well as equilateral. The planes where the mirrors are mounted are each perpendicular to a corresponding plane of incidence defined by any two adjacent passages in block 18. Stated alternatively, the normal of the plane of each cut portion bisects the angle formed by the two passages incident thereon. Similarly, path 112 is formed by passages 113, 114, 115 and 116 and mirrors 130, 131, 132 and 133. Mirrors 30 through 33, and 130 through 133 comprise dielectric stacks of alternating layers of high and low dielectric constant deposited on polished substrates to form reflectors at the operative wavelength, as is known in the art. Preferably, one of the mirrors in each path 12 and 112, such as mirror 31 and 131, respectively, is spherical in order to control the mode size of the beams circulating in the ring paths 12 and 112, as is known in the art. Gyro block 18 is a cubic block of low expansion material, such as a machinable glass-ceramic material commercially available as Zerodur by Schott Optical Company.

Ring paths 12 and 112 intersect in two places, specifically, at locations 90 and 92. The two paths thus share the same gas envelope. Passages 13 through 16, and 113 through 116 are filled with a gain medium suitable for laser operation, such as a mixture of helium and neon for operation at the 0.6328 micrometer wavelength. A laser beam is produced in the first path 12 by an electrical discharge generated between cathode 20 and anodes 22 and 24 by power supply 40 and discharge control 42. The cathode is connected directly to the negative electrode of power supply 40, while anodes 22 and 24 are each connected to a separate positive electrode of discharge control 42 whose function is to maintain an equal discharge current in both discharge regions, i.e. a first region defined between cathode 20 and anode 22 and a second region defined between cathode 20 and anode 24, in order to minimize deviations of the indicated rotation rate due to the Fresnel-Fizeau effect, as is known in the art. A laser beam is produced in the second path 112 by an electrical discharge generated between cathode 20 and anodes 122 and 124. Anodes 122 and 124 are each connected to a second set of positive electrodes of discharge control 42, also to maintain equal discharge currents in both discharge regions. Use of a common gas envelope has the advantage of allowing the use of only one cathode for the generation of two separate discharges, thus simplifying the design of the cavity and eliminating the cost of a second cathode. Alternatively, a second cathode could be mounted at intersection point 90 for excitation of ring path 112.

Figure 2:
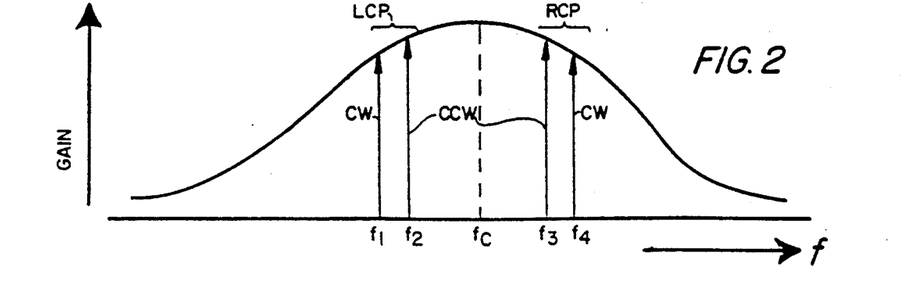
FIG. 2 shows the mode component distribution present in each of these ring paths for the gyro of FIG. 1.

The laser beams thus generated include a first beam of counter-propagating beam components of a predetermined mode of electromagnetic energy in path 12 and a second and independent beam of counter-propagating beam components in path 112. The image rotation imparted to the counter-propagating beam components by each nonplanar path provides a reciprocal (direction-independent) circular birefringence which results in a frequency splitting of the selected mode into two circularly polarized mode component pairs. Referring now to FIG. 2, a first pair, comprising clockwise and counterclockwise mode components $f_1$ and $f_2$ which are, for instance, left-hand circularly polarized (LCP), is separated in frequency from a second pair, comprising counterclockwise and clockwise mode components $f_3$ and $f_4$ which are right-hand circularly polarized (RCP). Faraday rotators 36 and 136 are correspondingly placed in one of the passages of each path, here shown as passage 13 in path 12 and passage 113 in path 112, to provide a non-reciprocal or direction-dependent, polarization rotation to produce a frequency splitting between counter-propagating components in each of the pairs, for instance, between $f_1$ and $f_2$ in the LCP, and $f_3$ and $f_4$ in the RCP pair. This is usually referred to as the Faraday bias. A more detailed description of such a circularly polarized gyro using a nonplanar path may be found in U.S. Pat. No. 4,110,045 discussed hereinabove. Alternatively, the Zeeman effect may be used to provide the direction-dependent polarization rotation. This is achieved by providing a magnetic field having a component along the optic axis within the gain medium in the discharge region. A more detailed description of a gyro using the Zeeman splitting as the means for producing the Faraday bias may be found in U.S. Pat. No. 4,229,106, issued Oct. 21, 1980, to Dorschner et al., and assigned to the present assignee. As a third alternative, in place of Faraday rotators 36 and 136, mirrors 30 and 130 may be formed on magnetized layers, such as manganese bismuth, in which the magnetic field is made perpendicular to the plane of incidence in order to provide the requisite direction-dependent polarization rotations. A more detailed description of magnetic mirrors may be found in U.S. patent application Ser. No. 257,303, filed on Apr. 23, 1981 by Herman Statz et al. and assigned to the present assignee.

One of the mirrors in each path, for instance mirror 32 in path 12 and mirror 132 in path 112 is made partially transmitting in order to extract the modes circulating in paths 12 and 112. Output optics 50 and 150 are placed directly on output mirrors 32 and 132, respectively, with each being used to combine the counter-propagating mode components and isolate each polarization in a respective path on separate diodes, respectively, 51a and 51b, and 151a and 151b, in order to detect the beat frequencies between the counter-propagating mode components for each polarization, i.e. ($f_2$-$f_1$) and ($f_4$-$f_3$). For each path, then, there will be two frequency difference signals. The resulting four signals are separately preamplified in preamp 52 before being fed to signal processor 54. Signal processor 54 generates a first and second output signal indicative of the rotation rate as sampled by path 12 and 112, respectively. Each output signal is generated from the two frequency difference signals corresponding to one of the paths. For instance, it may be generated by subtracting one beat frequency from the other to remove the Faraday bias. The output signals thus generated are then coupled to utilization device 56, which may include a visual display or other operator interface. A more detailed description of suitable output optics 50 and 150 may be found in U.S. Pat. No. 4,141,651, issued Feb. 27, 1979 to Smith et al. and assigned to the present assignee.

Cathode 20 comprises a substantially spherical conductive envelope of a material suitable for the generation of free electrons. Cathode 20 is hermetically sealed to the center of one of the faces of cube 18 adjacent the intersection of passage 15 with passage 115. Cathode 20 is coupled to ring path 12 and 112 through auxiliary passage 60 which is drilled to intersect passages 15 and 115.

Anodes 22, 24, 122 and 124 each comprise a conductive electrode. Anodes 22 and 24 are coupled to ring path 12 through auxiliary passages 61 and 62, respectively, drilled to intersect passages 14 and 16. Anodes 122 and 124 are coupled to ring path 112 through auxiliary passages 161 and 162, drilled to intersect passages 114 and 116, respectively. The ends of electrodes 22, 24, 122 and 124 do not intersect their corresponding passages but stop a short distance therefrom. Electrodes 22, 24, 122 and 124 are held in place by seals 23, 25, 123 and 125, respectively, which also prevent leaks in the gain medium.

The diameter of the inactive region in each ring path, that is, the portion of passages 13, 14 and 16 between electrodes 22 and 24 on the opposite side from cathode 20, for ring path 12, and the portion between electrodes 122 and 124 on the opposite side from cathode 20 for ring path 112, is of a size larger than the diameter of the active region, that is the portion of passages between the two electrodes 22 and 24 and cathode 20 for ring path 12 and the portion of passages between electrodes 122, 126 and cathode 20 for ring path 112, to ease the manufacturing tolerances and to reduce diffraction losses of the circulating beams.

Figures 3, 4:
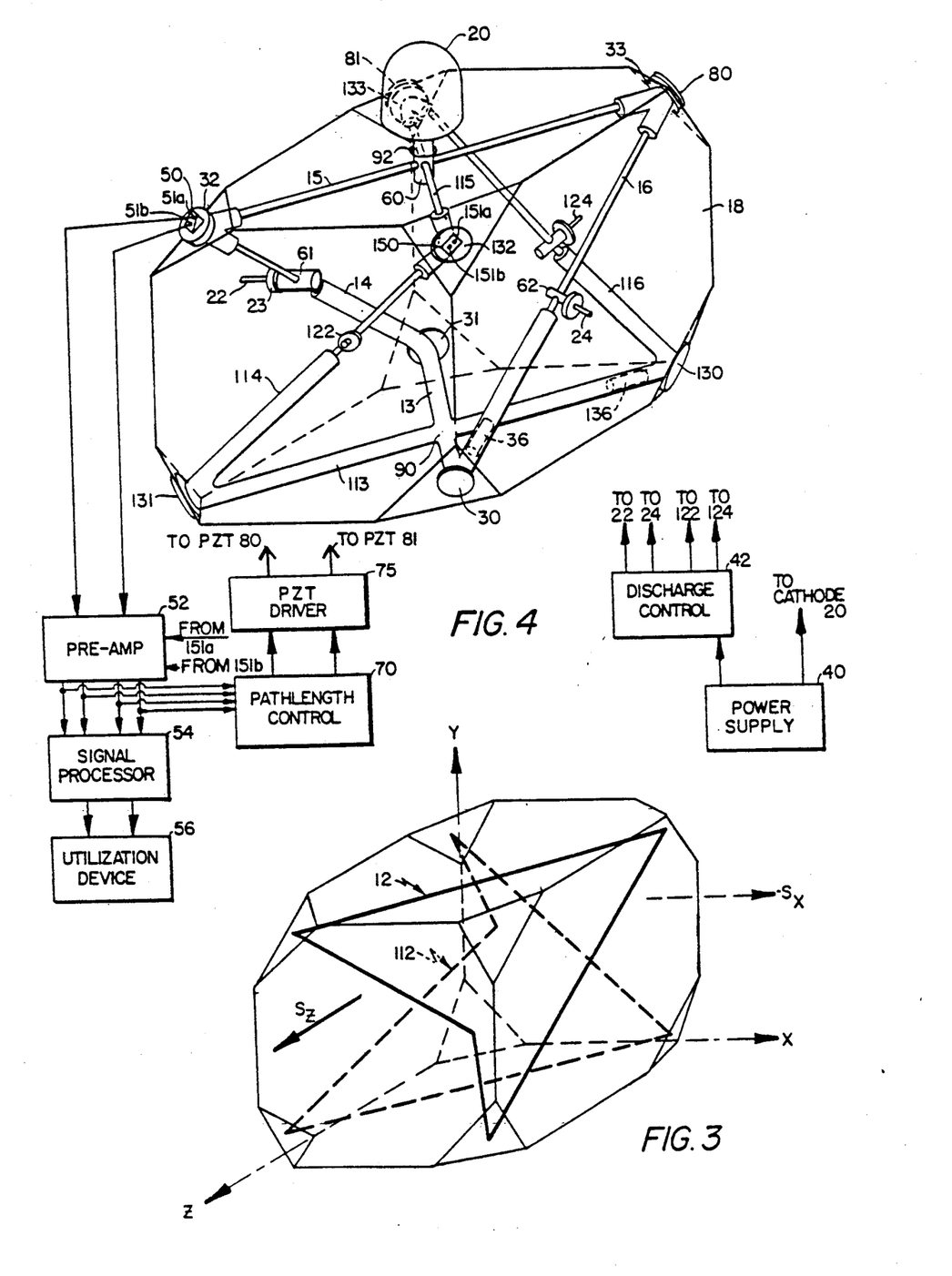
FIG. 3 shows a simplified representation of the gyro block of FIG. 1, showing the supporting cube and the ring paths.
FIG. 4 shows a second embodiment of the laser gyro system of FIG. 1.

In addition to using a common gas reservoir and a shared cathode, the two rings have the advantage of having identical shape and size, hence, identical scale factor. The sensitive axis bisects the dihedral angle between the two planes of a nonplanar skew rhombus ring. More generally the sensitive axis is found to be perpendicular to the plane defined by the midpoints of the path segments for any nonplanar quadrilateral ring. For the case of the tetrahedral rings shown in FIG. 1, the sensitive axes are orthogonal to each other and lie along principal cube axes as shown in FIG. 3. This facilitates the alignment of the individual gyros.

Because the two rings share a common gas reservoir, both ring gyros will fail if the gas becomes contaminated or if the vacuum system fails. Such a failure mode is analogous to that of the two-degree-of-freedom (TDOF) tuned rotor mechanical gyro. The orthogonal diad of the present invention is in itself a useful inertial measurement element for two-dimensional navigation or pointing applications. It may be used as a replacement for the two-degree-of-freedom mechanical gyros used in some missile applications. One important advantage is that two rings are nested in the same volume as one, and that the two sensitive axes are independent and rigidly held in a precise and stable orientation.

Each of the two tetrahedral rings has two orthogonal planes of symmetry. If this symmetry is maintained, it has important implications for the allowed beam motions and the resulting gyro performance. Symmetry can be maintained under uniform expansion if no pathlength control is used. Use of no pathlength control is of interest for high-accuracy temperature controlled gyros.

If no pathlength control is used, any ring will retain its original shape under the influence of uniform expansion. In this case there is no relative beam motion, either on the mirrors or within the bores, and no adverse performance effects are expected. Specifically, the lack of relative beam motion results in a substantially constant backscatter level, thus reducing the drift in the rotation indicating output signal which normally arises from variations in the net scatter.

Operation of the gyro with no pathlength control is also particularly useful in those applications in which mode shifts due to changing pathlength can be tolerated, as, for instance, in those applications encountering a small predetermined range of operating temperature.

Referring now to FIG. 4, there is shown the tetrahedral ring laser gyro of FIG. 1 modified to include one pathlength control (PLC) mirror for each ring path and here shown as mirrors 33 and 133, respectively. Supporting PLC mirrors 33 and 133, there is shown piezoelectric actuators 80 and 81 whose functions are under control from pathlength control 70, to position mirrors 33 and 133 so as to maintain a predetermined constant pathlength for ring paths 12 and 112. This is accomplished by a feedback network which uses the D.C. signal components available for each of the two ring paths at preamplifier 52 and which indicate the relative intensities of the circularly polarized mode components pairs. These D.C. signals are coupled to pathlength control 70 which produces an appropriate error signal as a function of the difference of their relative intensities for each of the two ring paths. This is done to maintain the mode components, corresponding to the two circularly polarized pairs present in each path, symmetrically within the bandwidth of the gain medium, as shown in FIG. 2. The two error signals produced by pathlength control 70 are then applied to piezoelectric driver 75 to produce a corresponding voltage signal which is applied to, respectively, PZT actuators 80 and 81. The voltage applied causes a corresponding contraction or expansion of PZT actuators 80 and 81 which move mirrors 33 and 133 to corresponding positions that compensate for any pathlengh changes in their respective rings. A more detailed description of pathlength control is found in U.S. Pat. No. 4,108,553, issued Aug. 22, 1978 to Zampiello et al. and assigned to the present assignee.

The orthogonal ring laser gyro diad is also a building block for higher order arrays. Redundant orthogonal arrays can be configured by close-packed stacking of properly oriented identical diads, thereby eliminating the substantial mounting space required by arrays formed with planar rings. Many arrays of orthogonal TDOF mechanical gyros have been proposed over the years to generate redundant strapdown sensors for a variety of applications. The orthogonal tetrahedral diads can be used directly in any of these configurations. Many failure detection and isolation techniques derived for these applications remain applicable to the laser gyro version.

Figure 5:
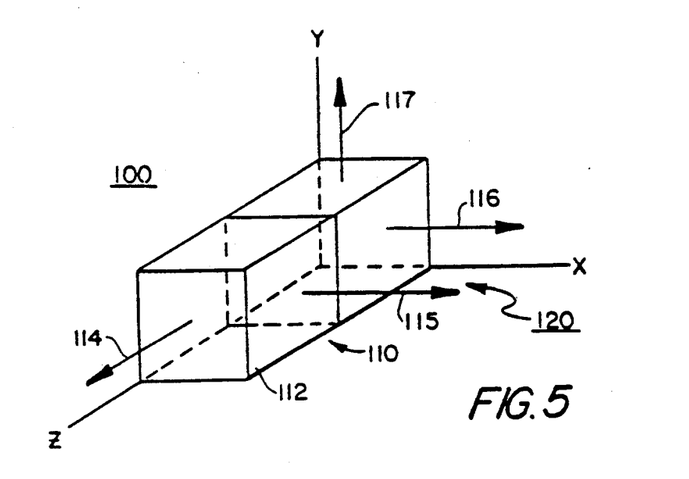
FIG. 5 shows a laser gyro array formed by packing two laser gyro diads such as shown in FIG. 1 to result in a triad with a single redundant axis.

Referring now to FIG. 5, it can be appreciated that an orthogonal triad 100 with a single redundant axis can be synthesized by close-packing two diads 110 and 120. Diad 110 is similar to the diad of FIG. 1 and comprises cube 112 supporting therein two orthogonal tetrahedral ring resonant paths. The two paths and all the components needed to produce such paths are discussed in connection with the diad of FIG. 1, thus they are not repeated here, and for simplicity, all the details have been removed leaving only the uncut cube 112 and two arrows representing the two orthogonal sensitive axes 114 and 115. As in FIG. 1, the sensitive axis 114 of the laser gyro defined by the first path is along the z-axis and the sensitive axis 115 of the laser gyro defined by the second path is along the x-axis. A second diad 120 is placed in contact with the first diad 110 along the x-y plane. Diad 120 is identical to diad 110, except that it has been rotated around the x-axis by 90°. This has the effect of placing a first sensitive axis 117, corresponding to a first gyro contained in diad 120, along the y-axis, and a second sensitive axis 116, corresponding to a second gyro contained in diad 120, along the x-axis. Thus, triad 100 defined by this arrangement of orthogonal diads 110 and 120 has a sensitive axis along each of the three cartesian coordinates. One cartesian direction, here chosen as the x-direction, is covered by one sensitive axis from each of the two diads, i.e. sensitive axes 115 and 116, and is therefore redundantly sensed, or redundant. The redundancy of this array has the advantage of allowing use of the best three gyros from every two diads, thus improving the effective manufacturing yield; alternatively, it might be used to cover a particular coordinate direction which is more critical than the others.

Figure 6:
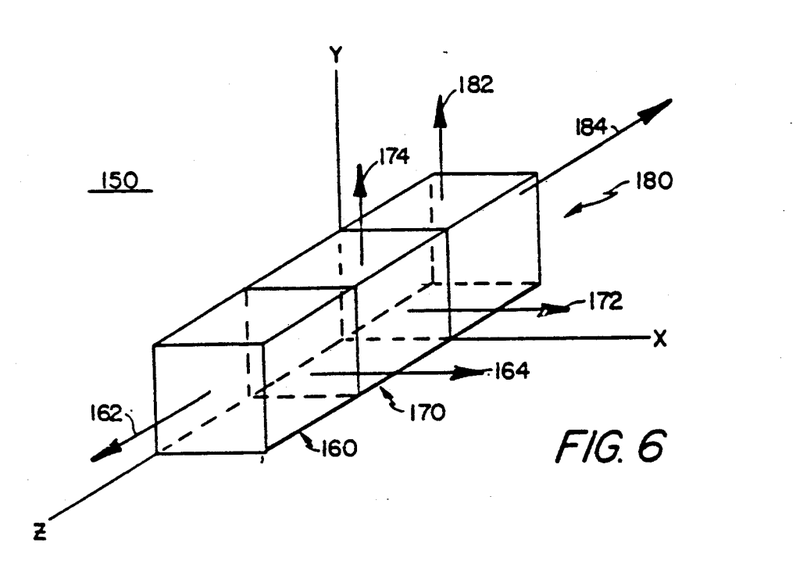
FIG. 6 shows a six-gyro orthogonal laser gyro array formed by packing three laser gyro diads to result in redundancy for each of the three cartesian axes.

Referring now to FIG. 6, there is shown a six-gyro orthogonal array 150, formed by three orthogonal diads 160, 170 and 180 oriented to provide single redundancy for each of the cartesian directions. As for FIG. 5, only a simplified cube and two arrows representing the orthogonal sensitive axes are shown for each diad. Diad 160 is identical to diad 110 of FIG. 5. It has two sensitive axes 162 and 164 along the z- and x-directions, respectively. Diad 170 is identical to diad 120 of FIG. 3 and is a diad identical to diad 160 rotated 90° about the x-axis to produce two sensitive axes 172 and 174 along the x- and y-directions, respectively. A third diad 180 is placed adjacent diad 170 along the an x-y plane. Diad 180 is again identical to diad 160 and is simply rotated 90° about the x-axis and 90° about the y-axis to produce two sensitive axes 182 and 184 along the y- and z-directions, respectively. The tetrahedral diads are simply oriented by packing the corresponding cubes face to face. Thus, there is a substantial volume savings, since there is no wasted volume in orienting the various ring paths, i.e. the volume of the configuration is the volume of the three cubes.

High order levels of redundancy can be synthesized by the continued stacking or packing of additional diads. Depending on the required form factor for the application, it may be advantageous to closely pack the diads other than linearly.

Figure 7A:
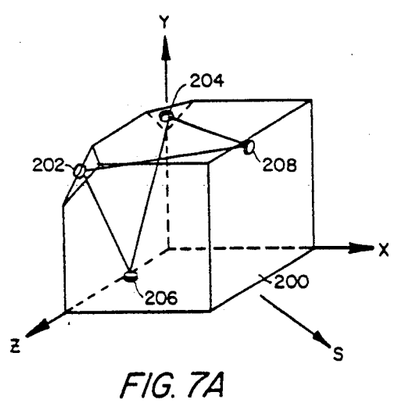
FIG. 7A shows an orthohedral ring path which can be used in the gyro system of FIG. 1.

The tetrahedral ring is just one of the special cases of the more general skew rhombus ring. A skew rhombus ring is a nonplanar ring having four equal sides and can be generated by folding a planar rhombus about a diagonal. Another useful special case of skew rhombus rings is the orthohedral ring. The orthohedral ring is a skew rhombus whose intersecting planes are orthogonal. An orthohedral ring may be configured on a supporting cube as shown in FIG. 7A. Two of the mirrors 202 and 204 are placed at corresponding vertices of cube 200 on planes of the form $\{1,1,1\}$ and the remaining two mirrors 206 and 208 are placed on two of the existing cube faces of the form $\{1,0.0\}$. The sensitive axis S is along the $\{1,-1,0\}$ direction, as indicated by the arrow.

Figure 7B:
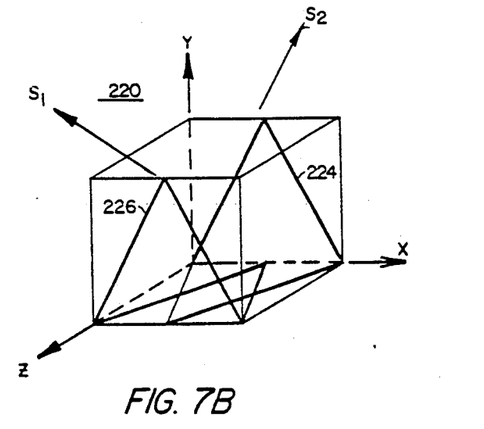
FIG. 7B-C show orthogonal and skewed diad configurations for the orthohedral ring path of FIG. 7A.

A first diad configuration using such orthohedral rings is shown in FIG. 7B. For simplicity, only the beam paths are shown. The paths intersect at two places on the lower cube face. The omitted details for a complete gyro systems are analogous to those shown and discussed in connection with FIG. 1, and the mirror mounting is analogous to that shown in FIG. 7A. The sensitive axes $S_1$ and $S_2$ for ring paths 224 and 226 lie along the $y+z$ and the $y-z$ directions, respectively, and are therefore orthogonal.

Figure 7C:
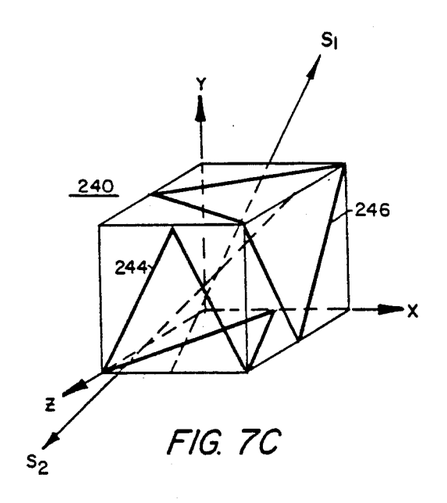

A second diad configuration 240 using orthohedral rings is shown in FIG. 7C. Again, for simplicity, the details of the complete laser gyros have been omitted. Here, the two paths 244 and 246 do not intersect and the two gyros may be isolated for maximal failure protection. The sensitive axis $S_1$ for ring path 244 lies along the direction $y-z$, and the sensitive axis $S_1$ for ring path 246 lies along the direction $-x-y$. These axis are skewed at 120° to one another. Such nonorthogonal diads are useful building blocks for skewed, or nonorthogonal, arrays. For example, a tetrad, or four-axis sensor array, may be synthesized from two close-packed skew diads of the type 240. This first diad is oriented as shown in FIG. 7C; the second is rotated 180° about the y axis from that of FIG. 7C. The resultant four sensitive axes are equally spaced on a cone of apex 45° opening along the y axis. Advantages of skewed arrays include the capability of detecting failure(s) of individual sensors, and, for arrays of order higher than four, of isolating such failures, as is well known in the art.

Figure 7D:
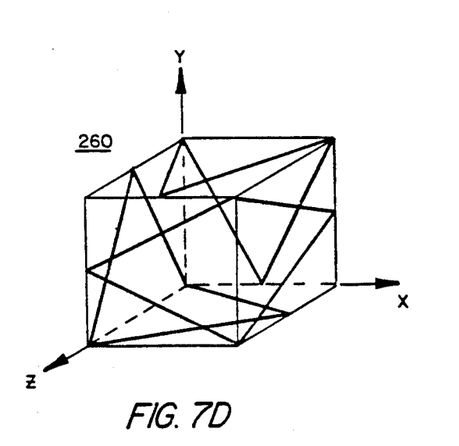
FIG. 7D shows a planar triad formed by packing three orthohedral ring paths on the faces of a single cube.

A higher packing density is obtained by using all six faces of the supporting block to mount three orthohedral rings, as shown in FIG. 7D. The sensor array 260 shown has three-fold symmetry about the major cube diagonals, that is, the (1,1,1) directions. The sensitive axes are minor cube diagonals, that is, the (110) directions. The three sensitive axes are skewed at 120° to one another and are therefore coplanar. This results in a redundant diad with the capability of failure detection, i.e., for an input rotation rate along any direction, the sum of the indicated rotation rates from the three independent ring gyros must be substantially zero unless at least one ring is malfunctioning. These orthohedral planar triads can in turn be used as building blocks for higher-order skewed multiple-axis systems. Complex redundant arrays can be conveniently and flexibly configured from these diads.

If necessary, all of the configurations discussed above may be made to have isolated ring laser paths by slightly shifting one of the paths with respect to the other. This may be accomplished by moving the location of the mirror surfaces for one of the paths along one of the three-coordinate axes, in effect "stretching" the supporting cube by translating one of the paths, i.e., by mounting the rings on a rectangular parallelepiped.

Modifications to the described embodiments will be apparent to persons skilled in the art without departing from the spirit and scope of this invention. Accordingly, it is intended that this invention be not limited except as defined by the appended claims.

What is claimed is:

1. In combination:
   a single supporting block;
   means, disposed on said block, for providing a plurality of nonplanar ring resonators within said block, such nonplanar ring resonators comprising equiangular skew rhombus rings having equal length path segments, all of the path segments of said plurality of ring resonators being substantially distinct;
   means for producing a beam of electromagnetic energy in each one of the plurality of nonplanar ring resonators; and
   wherein the paths of each one of the plurality of nonplanar ring resonators are arranged to provide circular birefringence to the beam of electromagnetic energy produced in such resonator.

2. The combination of claim 1 wherein such electromagnetic energy beam producing means comprises a single cathode.

3. In combination:
   a single supporting block; and
   means for providing a plurality of nonplanar ring resonators within said block, each one of the plurality of resonators comprising a nonplanar path forming an equiangular skew rhombus rings disposed on two intersecting planes and having equal length path segments arranged to impart circular birefringence to a beam of electromagnetic energy propagating in such nonplanar ring resonator, all of said path segments of said plurality of ring resonators being substantially distinct.

4. A laser gyro comprising:
   means for providing a predetermined supporting volume;
   means for providing a first nonplanar ring resonant path comprising a first plurality of reflectors disposed on said supporting volume producing a path disposed on two intersecting planes and having a first sensitive axis;
   means for providing a second nonplanar ring resonant path comprising a second plurality of reflectors disposed on said supporting volume providing an equiangular skew rhombus path disposed on two intersecting planes and having a second sensitive axis, said second plurality of reflectors being distinct from said first plurality of reflectors;
   means for producing counter-propagating beams in each of said first and second nonplanar paths; and
   wherein the first and second nonplanar ring paths circumscribe a common volume within said predetermined supporting volume, the first and second sensitive axes intersecting within said common volume.

5. The laser gyro of claim 4 wherein said first sensitive axis is in a different direction than that of said second sensitive axis.

6. The laser gyro of claim 5 wherein:
   said first and second non-planar ring paths intersect at one place.

7. The laser gyro of claim 6 wherein:

said beam producing means comprises a single cathode.

8. The laser gyro of claim 7 wherein:
said cathode is coupled to the region of intersection between said first and second path.

9. A laser gyro system comprising:
a plurality of supporting regions disposed within a single supporting structure; and
means for providing a plurality of nonplanar ring resonators producing a plurality of independent sensitive axes, said sensitive axes having at least one component along each of three mutually orthogonal coordinates, said means comprising a plurality of mirrors, disposed on said supporting regions, providing a nonplanar ring path nested in each of said plurality of regions, each nonplanar ring path comprising an equiangular skew rhombus ring having equal length segments disposed on two intersecting planes and being arranged to provide circular birefringence to a beam of electromagnetic energy propagating in such nonplanar ring path, all of said path segments of said plurality of ring resonators being substantially distinct.

10. A laser gyro comprising:
a supporting block;
means for providing a plurality of resonators within said supporting block, said providing means comprising a plurality of reflectors forming a plurality of resonant paths, each one of the plurality of resonant paths comprising an equiangular skew rhombus ring having predetermined geometry and pathlength and employing distinct reflectors, the circumscribing volume of each one of the plurality of resonant paths being approximately equal to the volume of said supporting block.

11. A laser gyro comprising:
a supporting block;
means for providing a plurality of resonators for the propagation of counter-propagating mode components of electromagnetic energy comprising a plurality of reflectors forming a plurality of nonplanar paths having a nominal pathlength nest within said block, each of said paths comprising an equiangular skew rhombus ring having four equal length path segments disposed on two planes, all of said path segments of said plurality of resonators being substantially distinct, said reflectors providing an image rotation to waves propagating therein to produce circularly polarized mode components having a frequency separation between mode components of different polarization sense; and
means for producing a frequency separation between counter-propagating mode components of like polarization sense.

12. The laser gyro of claim 11 further comprising:
means for generating an output signal as a function of the frequency difference between said counter-propagating mode components.

13. The laser gyro of claim 12 further comprising:
means for maintaining said path constant.

14. In combination:
a single supporting block;
means, disposed on said block, for providing a plurality of nonplanar ring resonators within said block, each of said nonplanar ring resonators having equal length path segments lying in two orthogonal planes, all of the path segments of said plurality of ring resonators being substantially distinct;
means for producing a beam of electromagnetic energy in each one of the plurality of nonplanar ring resonators; and
wherein the paths of each one of the plurality of nonplanar ring resonators are arranged to provide circular birefringence to the beam of electromagnetic energy produced in such resonator.

15. The combination of claim 14 wherein such electromagnetic energy beam producing means comprises a single cathode.

16. In combination:
a single supporting block;
means for providing a plurality of nonplanar ring resonators nested within said block, each one of the plurality of resonators comprising a nonplanar path disposed on two orthogonal planes and having equal length path segments arranged to impart circular birefringence to a beam of electromagnetic energy propagating in such nonplanar ring resonator, all of said path segments of said plurality of ring resonators being substantially distinct.

17. A laser gyro comprising:
means for providing a predetermined supporting volume;
means for providing a first nonplanar ring resonant path comprising a first plurality of reflectors disposed on said supporting volume producing a path disposed on two orthogonal planes and having a first sensitive axis;
means for providing a second nonplanar ring resonant path comprising a second plurality of reflectors disposed on said supporting volume providing a path disposed on two orthogonal planes and having a second sensitive axis, said second plurality of reflectors being distinct from said first plurality of reflectors;
means for producing counter-propagating beams in each of said first and second nonplanar paths; and
wherein the first and second nonplanar ring paths circumscribe a common volume within said predetermined supporting volume, the first and second sensitive axes intersecting within said common volume.

18. The laser gyro of claim 17 wherein said first sensitive axis is in a different direction than that of said second sensitive axis.

19. The combination of claim 18 wherein said first and second nonplanar ring paths intersect at one place.

20. The combination of claim 19 wherein said beam producing means comprises a single cathode.

21. The combination of claim 20 wherein said cathode is coupled to the region of intersection between said first and second path.

22. A laser gyro system comprising:
a plurality of supporting regions disposed within a single supporting structure; and
means for providing a plurality of nonplanar ring resonators producing a plurality of independent sensitive axes, said sensitive axes having at least one component along each of three mutually orthogonal coordinates, said means comprising a plurality of mirrors, disposed on said supporting regions, providing a nonplanar ring path nested in each of said plurality of regions, each nonplanar ring path having equal length segments disposed on two orthogonal planes and being arranged to provide circular birefringence to a beam of electromagnetic energy propagating in such nonplanar ring path, all of said path segments of said plurality of ring resonators being substantially distinct.

23. A laser gyro comprising:

a supporting block;

means for providing a plurality of resonators within said supporting block, said providing means comprising a plurality of reflectors forming a plurality of resonant paths, each one of the plurality of resonant paths lying in two orthogonal planes, each one of the plurality of resonant paths having predetermined geometry and pathlength and employing distinct reflectors, the circumscribing volume of each one of the plurality of resonant paths being approximately equal to the volume of said supporting block.

24. A laser gyro comprising:

a supporting block;

means for providing a plurality of resonators for the propagation of counter-propagating mode components of electromagnetic energy comprising a plurality of reflectors forming a plurality of nonplanar paths having a nominal pathlength nest within said block, each of said paths having four equal length path segments disposed on two orthogonal planes, all of said path segments of said plurality of resonators being substantially distinct, said reflectors providing an image rotation to waves propagating therein to produce circularly polarized mode components having a frequency separation between mode components of different polarization sense; and means for producing a frequency separation between counter-propagating mode components of like polarization sense.

25. A laser gyro of claim 24 further comprising means for generating an output signal as a function of the frequency difference between said counter-propagating mode components.

26. The laser gyro of claim 25 further comprising means for maintaining said path constant.

* * * * *